Dec. 10, 1963   J. M. SLATER   3,113,459
PRESSURE MEASURING DEVICE
Filed April 29, 1959   4 Sheets-Sheet 1

FIG. I

INVENTOR.
JOHN M. SLATER
BY Allan Rothenberg

ATTORNEY

Dec. 10, 1963  J. M. SLATER  3,113,459
PRESSURE MEASURING DEVICE
Filed April 29, 1959  4 Sheets-Sheet 2
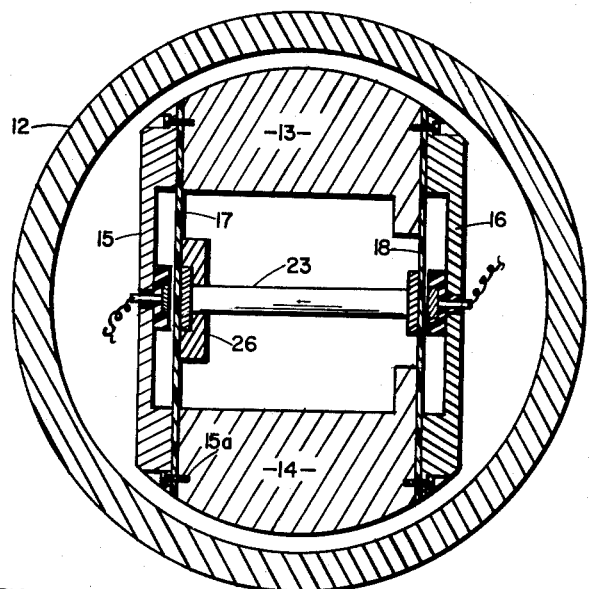
FIG. 2
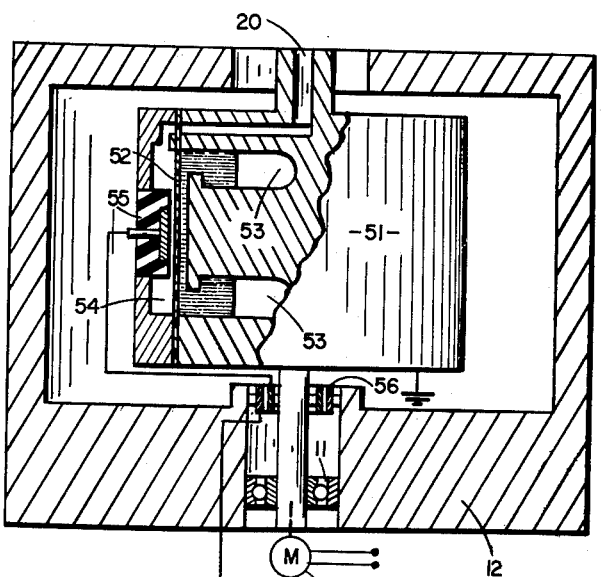
FIG. 3
INVENTOR.
JOHN M. SLATER
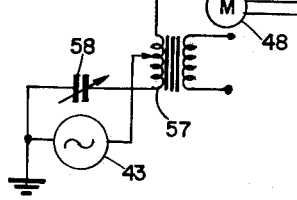
ATTORNEY INVENTOR.
JOHN M. SLATER
BY Allan Rothenberg

ATTORNEY

Dec. 10, 1963  J. M. SLATER  3,113,459
PRESSURE MEASURING DEVICE
Filed April 29, 1959  4 Sheets-Sheet 4

INVENTOR.
JOHN M. SLATER
BY Allan Rothenberg
ATTORNEY

United States Patent Office 3,113,459
Patented Dec. 10, 1963

3,113,459
PRESSURE MEASURING DEVICE
John M. Slater, Fullerton, Calif., assignor to
North American Aviation, Inc.
Filed Apr. 29, 1959, Ser. No. 809,644
4 Claims. (Cl. 73—398)

This invention relates to a pressure measuring apparatus, and more particularly concerns apparatus for making force balance measurement of high precision.

A preferred contemplated application of the invention is the measurement of barometric altitude in connection with gravity prospecting, although, as will appear hereinafter, the invention may also be used for force measurement in other applications such as aircraft altimeters and the like.

Gravity prospecting depends on measuring anomalies in the acceleration of gravity ($g$) which give evidence of the existence and nature of subterranean geological structure. For example, in the thick silt beds along the coast of the Gulf of Mexico there exist buried salt domes which are sometimes associated with oil. The domes may give no visible indication of their presence, yet, due to the difference in density between salt and silt deposits, a gravity anomaly may be detected. ($g$ may be higher, or lower, than average, depending on the relative densities.) Anomalies of interest are extremely small—on the order of 1 part in $10^6$ to 1 part in $10^7$.

The magnitude of $g$ is a function of distance R from the center of the earth, or altitude $h$ above a datum. ($g = K/R^2$ where K is a constant). Variations in measured $g$ which are due merely to variations in R or $h$ must be distinguished from those due to gravitational anomalies—in other words, R must be known to substantially the same proportional accuracy as the intended $g$ measurement. This amounts to having to determine $h$ to a foot or so, R being equal to $2 \times 10^7$ ft. approximately. (Since $g$ varies inversely as the square of the radius, a change of $g$ by 2 parts in $10^7$ results from a change in R by 1 part in $10^7$).

In practice $h$ is determined by surveying or by a refined technique based on use of precision aneroid (literally, "no-liquid") barometers (the mercury type being inapplicable because the weight of the mercury is mg.). Typically, a number of observations using both the gravimeter and the barometer will be carried out along a line or an area to develop a profile. Periodically the instruments will be checked against a central station of known $g$ and $h$. Drift between checks is assumed to be linear with time and the field data are corrected accordingly.

As may be surmised from the foregoing, extraordinary accuracy is required of the barometer so far as resolution and drift are concerned. (Absolute values of atmospheric pressure are usually of less importance).

Barometric pressure is about $10^6$ dyne/cm.$^2$ at sea level and falls off at the rate of about 11 percent per kilometer. This corresponds roughly to a change of 10 dyne/cm.$^2$ for each decimeter (about 4 inches) in going from $h=0$ to $h=1$ km. Thus, to resolve $h$ to 1 decimeter the barometer should have a drift, indeterminable bias, etc. corresponding to a pressure error no greater than 10 dyne/cm.$^2$ and a scale which is linear (or follows some other definite function) to one part in $10^4$.

Assuming for the sake of illustration an effective area of the bellows or diaphragm of a barometer, of 1 cm.$^2$, we see that allowable uncertainty forces, bias forces, etc. are of the order of 10 dynes. This often means a marginal sort of performance using traditional instrumentation techniques based on pivot-and-jewel bearings, variable-deflection springs, etc.

Precision aneroid altimeters have usually taken the form of a partially exhausted flexible-walled capsule, with spring restraint, and mechanical motion-multiplying linkages to magnify the deflection of the capsule under atmospheric pressure. Accuracy is limited by hysteresis and change of compliance in the flexible elements and friction in the linkage.

There have also been proposed pressure measuring systems, primarily intended for air or water speed measurements, in which dynamic pressure from a pitot tube is balanced against pressure generated by a compressor or pump drawing from the same ambient source of air. Such devices are useful for their intended purpose, where measurements to one percent or so suffice, but are of little value for precision altimetry, because of uncertainties due to turbulence, friction, etc.

Accordingly, it is an object of this invention to provide an absolute instrument for measurement of forces with a high degree of accuracy.

The invention contemplates a force balance system in which a rotatably-mounted member is adapted to be deformed or displaced by the application thereto of the force to be measured. The displaceable member is rotated so as to effect centripetal acceleration thereof to cause a centrifugally-generated force to be applied to the member in opposition to the force to be measured. The magnitude of the centrifugally-generated balancing force is controlled in accordance with measured displacement of the displaceable member so as to maintain such displacement at a null. In accordance with one embodiment of the invention, a mass loaded flexible member is centripetally accelerated by its own rotation. The acceleration which is a function of the spin velocity and the effective radial displacement of the mass of the flexible member may be controlled in response to measured deformation of the flexible member by controlling either the spin velocity or the effective radial displacement of the mass. Thus, the measurement is of an absolute type determined solely by quantities of mass, length and time, while being substantially insensitive to gravity or other translational acceleration.

Especially for high-precision applications, the digital computer is coming into increasing use because of its flexibility and high accuracy. The output of the instrument of this invention is a shaft rotation rate (or angle) which is a function of pressure. This mechanical signal is readily convertible to digital form with the aid of commutators or other functionally similar devices.

An object of this invention is to provide a force measuring device having a precision-generated balancing force.

Another object of this invention is to compare an unknown force with a known centrifugal force.

Still another object of this invention is the measurement of an unknown force in the presence of spurious acceleration.

Still another object of the invention is the provision of a barometer of absolute type having a minimum temperature coefficient.

A further object of the invention is the provision of a force measuring instrument wherein an unknown force is balanced by an accurately-generated hydraulic pressure.

Another object is to provide a pressure-measuring instrument, the output of which is suitable for forming the input to a digital computer.

These and other objects of the invention will become apparent from the following description taken in connection with the accompanying drawings in which FIG. 1 is a sectional view of one embodiment of the invention, together with the electrical circuitry thereof;

FIG. 2 is a section taken on lines 2 of FIG. 1;

FIG. 3 illustrates another embodiment of the invention;

Figure 5:
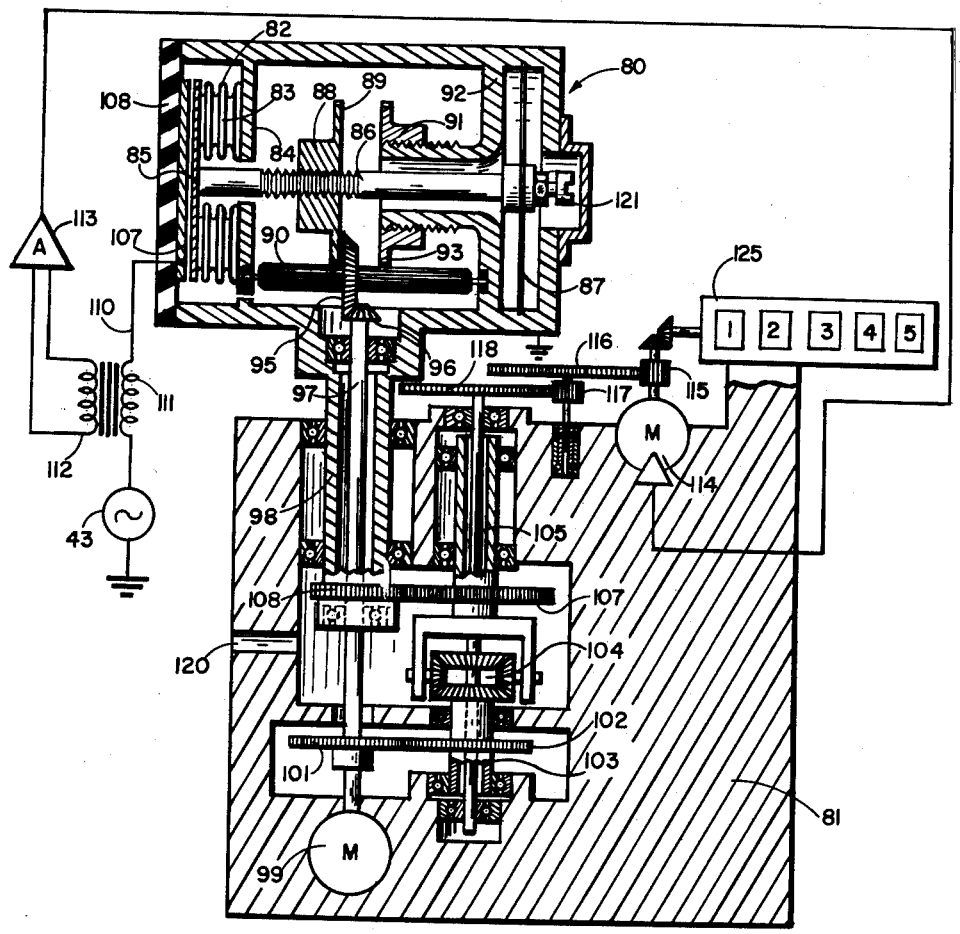
Figure 6:
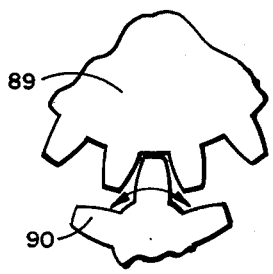

And FIGS. 5 and 6 illustrate still another embodiment of the invention.

In the drawings, like reference characters refer to like parts.

Figure 1:
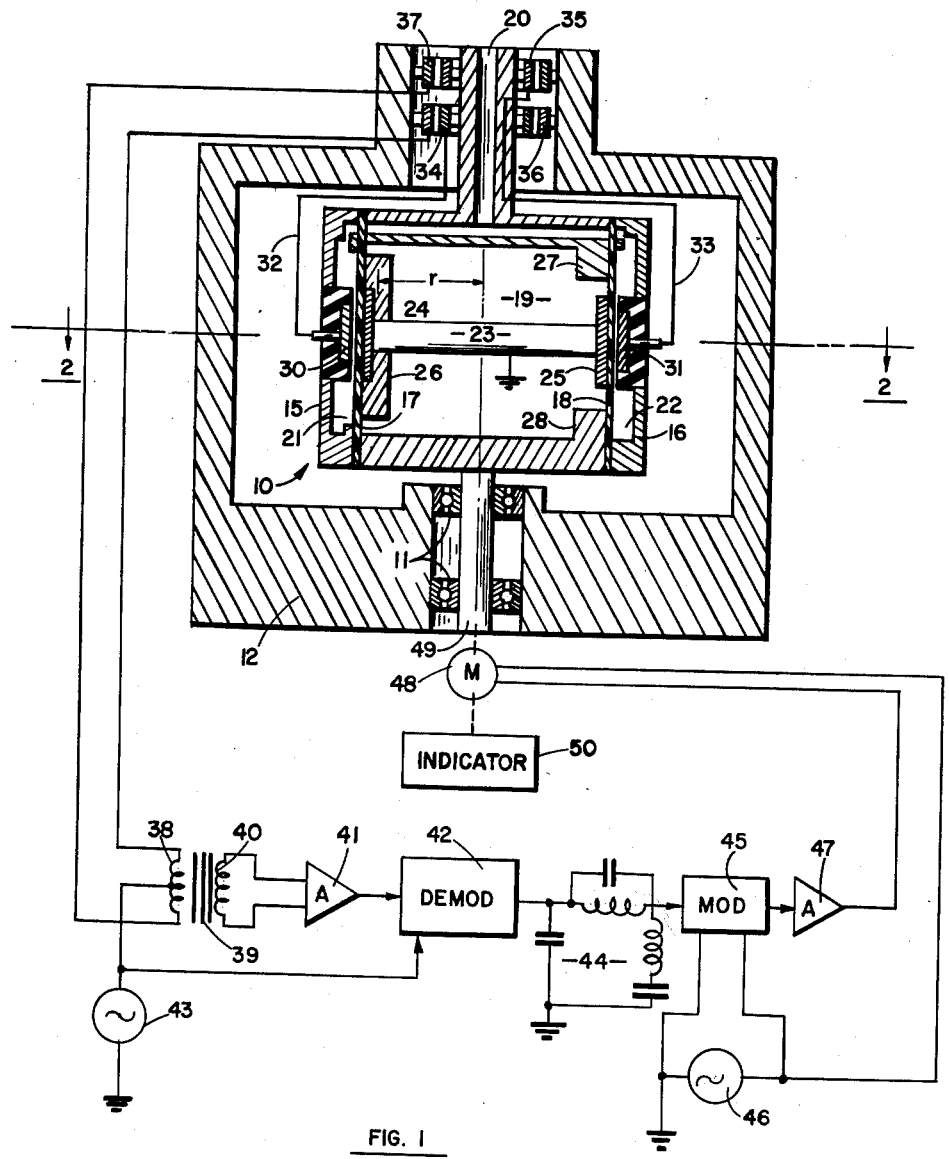

Referring now to FIGS. 1 and 2, a capsule 10 is rotatably mounted by means of bearings 11 in a support or casing 12. The capsule comprises a tube having side wall members 13, 14 to which are secured, as by bolts 15a, a second pair of side wall members 15, 16. A flexible member, such as diaphragm 17 and diaphragm 18, is secured between the respective walls 15, 16, and the inner portions of the capsule to provide an inner capsule chamber 19 which is preferably evacuated. A conduit 20 is open at the upper end thereof to the fluid pressure which is to be measured and is in fluid communication with chambers 21, 22, formed between the side walls 15, 16 of the capsule and the respective diaphragms 17, 18. A spool-shaped member 23 rigidly interconnects the two diaphragms and has the disc-shaped end members 24, 25 thereof suitably affixed, as by cement, to the inner surfaces of the diaphragms. A mass 26 is suitably secured to the inner face of the diaphragm 17 and has its center of mass spaced a distance $r$ from the axis of rotation or spin axis of the capsule.

The two diaphragms 17 and 18 are of different effective areas, the effective area of diaphragm 18 being reduced by the projections 27, 28 of the capsule wall members 13, 14. Where a small effective diaphragm area is required, it is simpler to utilize relatively large diaphragms to provide, by the difference in their areas, the small effective area. Capacitive pickoff plates 30 and 31 are mounted in the capsule walls 15 and 16 and electrically insulated therefrom. The diaphragms themselves, the disc members 24, 25 of the spool member 23, or the mass 26, form the movable plates of the capacitor pickoff which cooperate with the fixed plates 30, 31. If deemed necessary or desirable, for electrical symmetry, the mass 26 may be supplemented by an electrically similar member (not shown) of substantially less density, secured to the inner face of diaphragm 18. The movable pickoff plates 24, 25 may be grounded by grounding of the metallic spool member 23. Electrical leads from the fixed capacitor plates may be brought out from the capsule by conventional slip rings. However, to avoid the rubbing contact of such conventional slip rings, the pickoff leads 32, 33 are, as illustrated, connected to capacitor slip rings comprising annular conductive rings 34, 35, secured to the capsule and electrically insulated therefrom. The rings 34, 35 cooperate with the fixed metallic rings 36 and 37, respectively, secured to the housing 12 and electrically insulated therefrom, to form annular capacitors for transmitting the (high-frequency) pickoff excitation current.

The rings 36 and 37 are connected to opposite ends of the primary winding 38 of a transformer 39, having a secondary 40. A center tap of primary 38 is connected for energization by a suitable source of alternating current 43 having a frequency, for example, on the order of 5 to 20 kilocycles per second. A signal in secondary winding 40 is fed through amplifier 41 to a demodulator 42 which is phase referenced from source 43. The output of the demodulator 42 is smoothed and shaped in equalizing network 44, the output of which is fed to a modulator 45 which is supplied with a suitable alternating current source 46 which may have a frequency on the order of 400 c.p.s. The output of modulator 45 is fed through amplifier 47 to control the speed of a motor 48 which may be mounted to the housing 12 in any suitable manner and is connected to the shaft 49 of the capsule to effect rotation thereof. The motor speed, and thus the spin velocity of the capsule, may be indicated or recorded in any suitable indicator 50.

In operation, the pressure to be measured is applied via the conduit 20 and chambers 21 and 22, tending to deflect the diaphragms 17 and 18 inwardly of the evacuated chamber 19. Since the diaphragm 17 is larger than the diaphragm 18, a net pressure is exerted externally of the diaphragms, tending to shift the spool toward the toward the right in FIG. 1. The rotation of the capsule centripetally accelerates the mass 26 which thus exerts a centrifugal force radially outwardly from the spin axis (to the left in FIG. 1) in opposition to the radially inward force exerted by the perssure to be measured. The servo system, including the capacitor pickoffs, the demodulator and the motor 48 operates to rotate the capsule at whatever speed is necessary to keep the pickoff at null. Thus, a count of the shaft revolutions of the motor 48, as by indicator 50, over a known period of time gives the measure of input pressure applied via conduit 20.

For example, assuming a distance $r=3$ centimeters, a diaphragm effective area A (the difference in area between the two diaphragms) $=1$ square centimeter, and a mass loading of the diaphragm (by the mass element 26) $m=10$ grams, the centrifugal balancing force (the pressure developed on the diaphragm) $p=ma/A=10a$, where $a=$centripetal acceleration. Sea level atmospheric pressure$=10^6$ dyes/cm.$^2$, approximately. Thus, the centripetal acceleration $a$, required to balance such atmospheric pressure, is $10^5$ cm./sec. The centripetal acceleration $a=\omega^2 r$, and $\omega=(a/r)^{1/2}$ which is equal to 30 r.p.s. for the assumed constants of the instrument.

Lower operating speeds can be utilized if desired by increasing the radius $r$ or the mass $m$. Where the apparatus is to be used on a moving base such as an aircraft, for example, it is desirable to design the instrument so that centripetal acceleration $a$ is high in order to minimize the modulation effect due to any translational acceleration (normal to the spin axis) to which the device may be subjected. However, the apparatus is not subject to error due to the acceleration of gravity or to any other translational acceleration since the balancing centrifugal force is provided entirely from the capsule rotation. This balancing force is $ma=m\omega^2 r$. A horizontal acceleration of one-g will cause only a modulation of the pickoff signal at the rotation frequency, a one percent modulation in the above example. However, the modulation at such frequency will not affect the accuracy of the apparatus.

Further, it will be seen that the device is not subject to any temperature effects except that due to the substantially negligible change of radial distance $r$ upon expansion or contraction of the rotor capsule. There will also be an effect due to the mass of fluid (usually air) in the chambers 21, 22 under centripetal acceleration. However, such mass would be but $10^{-4}$ even with a volume of chambers 21, 22 of 1 cubic centimeter, and such effect is therefore negligible over any reasonable range of altitude and temperature.

As in any type of barometer utilizing flexible diaphragms, the flexible member is a critical element in the present invention. However, the disadvantages of use of a diaphragm are greatly minimized in the disclosed apparatus by reason of the fact that the diaphragm is maintained at a null or zero deflection. Thin sheets of a plastic such as that known as Mylar, or tensioned metal, are suitable.

To still further minimize the problem presented by the use of a flexible member such as a diaphragm or a bellows, the invention may be modified, as illustrated in FIG. 3, to provide a uniform liquid, instead of solid, loading of the diaphragm. In this embodiment, a centrifugally-generated hydrostatic pressure is balanced across the entire area of the diaphragm to enable the use of sheets having a thickness of less than 0.001 inch. As illustrated in FIG. 3, capsule 51, rotatably mounted by bearings 11 in housing 12, has a single diaphragm 52 which forms one wall of the inner chamber 53. The inner chamber 53, which is in communication with the diaphragm 52 over the entire inner surface thereof, contains a suitable liquid such as mercury. As in the embodiment of FIG. 1, the pressure to be measured is introduced via conduit 20 to a chamber 54 of which the diaphragm 52 forms one side. A single capacitor pickoff is utilized and comprises a fixed plate 55, while the movable pickoff plate is formed by the mercury in the chamber 53. As in the previous embodiment the lead from the fixed pickoff plate is coupled via capacitor slip rings 56 to one end of the primary 57 which has a center tap thereof connected to the source 43. In this embodiment, an adjustable trimming capacitor 58 may be coupled to the other end of the primary winding 57. The trimming capacitor 58 is initially adjusted for a pickoff null, and thereafter left unchanged. The remainder of the servo circuit of FIG. 3 between the transformer secondary winding and the motor 48 will be the same as that illustrated in FIG. 1. It is to be understood that the particular details of the illustrated servo circuit are shown for purposes of illustration only since many types of servo systems for providing a motor speed in accordance with a sensed deflection are well known to those skilled in the art.

The operation of the embodiment of FIG. 3 is substantially similar to that of FIG. 1. The input pressure to be measured tends to deflect the diaphragm 52 radially inwardly while the centripetal acceleration of the liquid in the chamber 53 of the rotating capsule is controlled by the servo system to exert a centrifugal force upon the diaphragm 52 in opposition to the input force to thereby maintain the diaphragm in a null position. Again, a count of the motor revolutions over a known interval of time provides an indication of the balancing hydrostatic pressure and thus of the force to be measured.

The apparatus of FIG. 3 will have a greater temperature sensitivity than that of FIG. 1 due to the change of the effective radial distance $r$ of the center of the liquid as the latter expands or contracts. It is the linear expansion coefficient, and not the volume coefficient which is effective. For a liquid such as mercury, the linear coefficient is about 6 parts in $10^5$ per deg./C. so that the temperature errors may still be tolerated in many applications. Of course, the smaller the radial extent of the liquid column, the lower will be the net coefficient of the apparatus.

Figure 4:
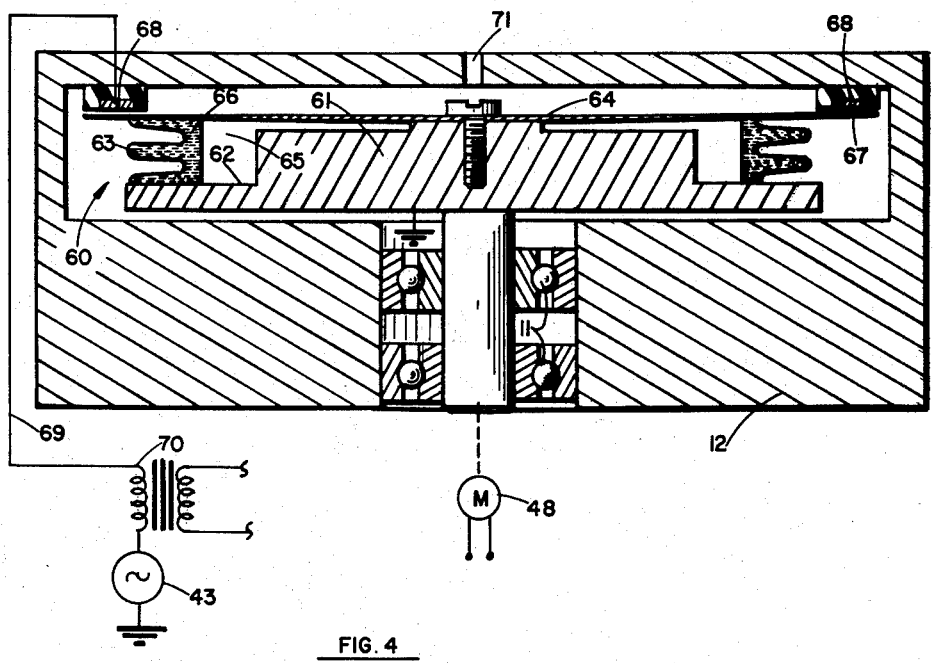
FIG. 4 is a view of a different embodiment.

An alternative form of liquid loaded diaphragm is illustrated in FIG. 4. The capsule 60 is rotatably mounted in housing 12 by means of bearings 11 and connected to be rotated about its spin axis by the motor 48. The capsule comprises a disc-shaped member 61 having an outwardly extending peripheral flange 62 to which is secured one end of a bellows 63. The upper end of the bellows is formed by a plate or disc 64 which is tapered radially outwardly as indicated to provide for linear expansion of the bellows in the direction of the spin axis of the capsule. In this manner the mass of the disc portion 64 of the bellows which must be moved is minimized. The bellows cooperates with the capsule element 61 to form an annular chamber 65 which is partially filled with a mass loading liquid 66. A peripheral flange 67 of the bellows disc member 64 extends outwardly from the body of the bellows for cooperation with an annular metallic plate 68 which is secured to the housing 12 and electrically insulated therefrom. The projecting rim or flange 67 of the bellows, together with fixed capacitor plate 68 provides the capacitor pickoff which is connected by lead 69 to one end of a transformer primary winding 70 which has the other end thereof connected to the source 43. Again, the servo circuit between the secondary of the transformer and the variable speed motor 48 may be identical with that illustrated in FIG. 1.

The pressure to be measured is introduced to the interior of the housing 12 and to the exterior of the bellows via conduit 71 to tend to compress the bellows downwardly in the illustration of FIG. 4. Centripetal acceleration of the liquid 66, in the rotating capsule 60, creates a centrifugally-generated hydrostatic pressure upon the liquid which in turn exerts a pressure on the bellows tending to move the upper portion thereof together with its capacitive flange 67 upwardly toward the fixed capacitive plate 68. Thus, as in the previous embodiments, the centripetal acceleration of the capsule is varied by controlling the angular velocity of the capsule to cause exertion upon the flexible member of a centrifugally-generated force in opposition to the input force which is to be measured. As mentioned above, the spin velocity of the capsule is a measure of the input pressure and may be suitably indicated.

Each of the embodiments described above has a quadratic output since $\omega$, the spin velocity, is proportional to the square root of the pressure to be measured. It will be noted, however, that this particular type of output is often desirable for barometric measurements since the measured pressure is an exponential function of altitude. Thus, the quadratic output will offset the exponential function of pressure and altitude to yield a more linear altitude scale than is available from a linear pressure measuring instrument.

The previously described embodiments provide a centrifugal balancing force by controlling the variation of the quantity $\omega$ of the centripetal acceleration $\omega^2 r$ in these embodiments while the quantity $r$ of the centrifugal force is maintained constant. It will be readily appreciated that the concepts of the present invention can be applied to an instrument utilizing a centrifugally-generated balancing force wherein the spin velocity is held constant and the radius of action $r$ is varied. Such an instrument will yield an output which is a linear function of the pressure to be measured.

The variation of the radius $r$ to control the centrifugal balancing force may be achieved by apparatus such as that illustrated ni FIG. 5. A capsule 80 is rotatably mounted upon a base 81 and contains an annular bellows 82 forming evacuated chamber 83 together with fixed capsule member 84 and an electrically conductive disc 85. Disc 85 is fixedly attached to one end of a screw 86 which is movably supported at the other end thereof by a flexible member which may comprise a thin perforated diaphragm 87 (or filaments or the like). Screw 86 carries a massive nut 88 having a gear 89 affixed thereto for engagement with an elongated pinion 90 which is journaled at the opposite ends thereof in the capsule 80. A geared counterweight nut 91 threaded oppositely from nut 88 engages the threads of a member 92, suitably affixed to the capsule structure. The gear 93, affixed to counterweight nut 91, also engages the pinion 90, whereby upon the rotation of the pinion, the nut 88 will be translated in one direction while the counterweight nut 91 will be translated in an opposite direction.

The pinion 90 is driven via gears 95, 96 and a shaft 97 which is journaled in a hollow shaft 98 itself journaled in base 81 and rigidly secured to and supporting capsule structure 80. Pinion driving shaft 97 is directly driven by a motor 99 suitably mounted in the base structure 81. The motor 99 is also arranged to normally drive the hollow shaft 98 at a rotational velocity equal to the rotational velocity of the inner shaft 97. Motor 99, a constant speed motor, drives hollow shaft 98 in synchronism with shaft 97 via a differential assembly comprising gears 101 and 102, having a 1:1 ratio; input shaft member 103, journaled in the base structure; differential gear assembly 104; shaft 105, journaled in the base structure; and reduction gears 107, 108 having a 2:1 ratio. Shaft 105 is secured to one gear of the differential 104 to provide a second input thereto. The output of the differential 104 is transmitted via gear 107 to gear 108 affixed to the hollow shaft 98.

In the absence of a rotational input applied to shaft 105, motor 99 will directly drive shaft 97, and via the differential, drives the hollow shaft 98 in synchronism therewith. An input rotation imparted to shaft 105 will effect variation of the phase angle between shafts 97 and 98 and thus produce a rotation of the pinion 90. Thus, an axial displacement of the massive nut 88 is achieved by an input rotation imparted to shaft 105, whereby the centrifugal force exerted on the bellows element 85 (radially and outwardly in FIG. 5) may be linearily controlled by the shaft rotation of shaft 105.

The bellows element 85 forms the movable plate of a capacitor of which the fixed plate comprises an electrically conductive member 107 mounted upon an electrically non-conductive member 108 secured to the capsule structure 80. A lead 110 connects plate 107 to the primary 111 of a transformer energized by source 43. A secondary winding 112 of the transformer feeds the capacitive pickoff signal to amplifier demodulator 113 which provides an output signal of magnitude and polarity in accordance with the magnitude and sense of the variation of the spacing of the capacitive pickoff elements from null position. Amplifier demodulator 113 drives a servo motor 114 to effect rotation of shaft 105 via gears 115, 116 and 117, 118.

The pressure to be measured is admitted to the apparatus via aperture 120 in base 81 which is in fluid communication with the exterior of the evacuated chamber 83 by means of the interior of hollow shaft 98. A massive screw 121 is threadedly engaged in the end of screw 86 for initially balancing the bellows-massive nut assembly so that no net centrifugal force exists on the bellows when applied external or input pressure is zero and the capsule structure 80 is rotating. Upon variation of the input pressure from zero, bellows member 85 tends to be deflected toward the right in FIG. 5 to thereby vary the output of the capacitive pickoff and cause the servo motor 114 to rotate shaft 105 at a speed proportional to the pickoff output signal. Rotation of shaft 105 effects, via differential 104, a rotation of shaft 97 relative to shaft 98 to thereby rotate the pinion 90 and effect translation of the massive nut 88 in a sense to cause the bellows massive nut assembly to change the centrifugal force exerted thereby (or to exert a centrifugal force increment) in a sense to balance the input pressure applied to bellows member 85. Thus, the movable pickoff member is held substantially at its null position, the pickoff output decreases to zero, shaft 105 comes to rest and shafts 97 and 98 again rotate in synchronism.

The output of the instrument of FIG. 5, which is a linear function of pressure, may be derived as any suitable indication of the shaft position of servo motor 114. As illustrated in FIG. 5, the output may conveniently be derived by means of a revolution counter 125, suitably geared to the servo motor output shaft.

Sliding friction between the gear teeth of gear 89 and pinion 90 may be neglected in all applications but those of highest precision. For the latter, this source of error may be obviated by providing a small amount of backlash (on the order of 0.0001 inch, for example) between the teeth of gears 89 and 90 as illustrated in FIG. 6, and introducing a slight continuous jitter or oscillation into the servo controller 113 in a manner well known in the art. Under such conditions, the pinion 90 is continuously oscillating relative to the gear 89 of nut 88 as indicated by the two-headed arrow of FIG. 6. During the instants when the teeth are not in contact, bellows member 85 is perfectly free to translate and the net result is to eliminate breakaway friction effects. It is to be understood that both the jitter arrangement for eliminating friction and differential arrangement for changing phase angle between a pair of rotating shafts are concepts of which the details form no part of this invention since such arrangements are well known in themselves.

While the mechanism of FIGS. 5 and 6 is rather intricate, it should be noted that no part thereof is of precision-quality requirement except screw 86 and nut 88 which are of about the same grade as that required for commonly available and relatively inexpensive hand micrometers. Once properly made and assembled, there is little difficulty in operation of the illustrated mechanism other than that of ordinary wear, and the latter will be minor since all parts are lightly loaded.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Fluid pressure measuring apparatus comprising a support, a mass loaded flexible diaphragm mounted to said support for rotation about a spin axis, means for applying the pressure to be measured to said diaphragm in a sense to effect deformation thereof, means for rotating said mass loaded diaphragm about said axis to effect centripetal acceleration thereof, and means for controlling said acceleration in accordance with the deformation of said diaphragm, said diaphragm comprising a pair of rigidly interconnected diaphragm elements of different effective areas mounted on diametrically opposite sides of said axis, the diaphragm element of larger area having a mass loading greater than that of the other of said elements.

2. Fluid pressure measuring apparatus comprising a support, a mass loaded substantially planar flexible diaphragm journaled in said support for rotation about a spin axis, conduit means for applying the pressure to be measured to said diaphragm to effect deformation thereof, and servo means for centripetally accelerating said mass loaded diaphragm about said axis to exert an inertial force opposing said applied pressure, said servo means comprising pickoff means for detecting said deformation and control means responsive to said pickoff means for controlling said inertial force in accordance with said detected deformation, said diaphragm comprising a pair of rigidly interconnected diaphragm elements of different effective areas mounted on diametrically opposite sides of said axis, the diaphragm element of larger area having a mass loading greater than that of the other of said elements.

3. Fluid pressure measuring apparatus comprising a support, an evacuated chamber rotatably mounted on said support, a pair of flexible diaphragms of different effective areas forming opposite walls of said chamber and having the exterior thereof exposed to the pressure to be measured, the diaphragm of larger area having greater mass loading than the other of said diaphragms, a pickoff having a pair of relatively movable parts respectively secured to each said diaphragm and another portion of said chamber, a motor connected to rotate said chamber, and a motor speed control connection from said pickoffs to said motor.

4. Fluid pressure measuring apparatus comprising a support, a mass loaded flexible member journalled in said support for rotation about a spin axis, said flexible member including a pair of rigidly interconnected diapram elements of different effective areas mounted on diametrically opposed sides of said axis, the diaphragm element of larger area having a mass loading greater than that of the other diaphragm element, conduit means for applying the pressure to be measured to said diaphragm elements to effect deformation thereof, and servo means for centripetally accelerating said mass loaded member about said axis to exert an inertial force opposing said applied pressure, said servo means comprising pickoff means for detecting said deformation, a variable speed motor for rotating said diaphragm elements about said axis, and control means including a speed control for said motor responsive to the output of said pickoff means for controlling said inertial force in accordance with said detected deformation.

References Cited in the file of this patent

UNITED STATES PATENTS

| | | |
|---|---|---|
| 839,982 | Bristol | Jan. 1, 1907 |
| 2,319,940 | Marrison | May 25, 1943 |
| 2,369,650 | Allen | Feb. 20, 1945 |
| 2,820,939 | Elwell | Jan. 21, 1958 |
| 2,905,000 | Roth | Sept. 22, 1959 |
| 2,906,120 | Buck | Sept. 29, 1959 |